United States Patent
Bartholomew et al.

(10) Patent No.: US 7,288,857 B2
(45) Date of Patent: Oct. 30, 2007

(54) SELF-LATCHING POWER SUPPLY APPARATUS

(75) Inventors: David B. Bartholomew, Springville, UT (US); Greg Perkins, Sandy, UT (US)

(73) Assignee: IntelliServ, Inc., Provo, UT (US)

( * ) Notice: Subject to any disclaimer, the term of this patent is extended or adjusted under 35 U.S.C. 154(b) by 312 days.

(21) Appl. No.: 10/907,724

(22) Filed: Apr. 13, 2005

(65) Prior Publication Data

US 2006/0232137 A1    Oct. 19, 2006

(51) Int. Cl.
*H01H 3/26* (2006.01)
(52) U.S. Cl. ...................................... 307/140
(58) Field of Classification Search ................. 307/140
See application file for complete search history.

(56) References Cited

U.S. PATENT DOCUMENTS

| | | | |
|---|---|---|---|
| 3,535,560 A | 10/1970 | Cliff | |
| 4,279,020 A | 7/1981 | Christian et al. | |
| 4,455,623 A | 6/1984 | Wesemeyer et al. | |
| 4,962,350 A * | 10/1990 | Fukuda | 323/283 |
| 5,945,745 A | 8/1999 | Macks | |
| 6,160,490 A * | 12/2000 | Pace et al. | 340/7.37 |
| 6,809,276 B1 | 10/2004 | Guzman | |
| 6,825,715 B2 * | 11/2004 | Andle | 329/370 |
| 7,098,697 B2 * | 8/2006 | Kucharski et al. | 326/126 |

* cited by examiner

*Primary Examiner*—Robert L. Deberadinis
(74) *Attorney, Agent, or Firm*—Jeffery E. Daly (57) ABSTRACT

A self-latching power supply apparatus is disclosed. The apparatus comprises an activation transistor in electrical communication with an input voltage source and a battery-switching transistor. Voltage detection circuitry may be intermediate the input voltage source and the activation transistor. An input port may be intermediate and operably connected to the input voltage source and the activation transistor. The activation transistor is in electrical communication with a battery-switching transistor. The battery-switching transistor is connected to a battery and a power supply node for an electric device. The activation transistor may be configured to activate the battery-switching transistor, enabling voltage from the battery to be available at the power supply node for the electric device. A deactivation transistor is in communication with the battery-switching transistor, and is configured to disrupt power flow from the battery. The transistors may be bipolar junction transistors or metal-oxide semiconductor transistors. The deactivation transistor may be controlled by circuitry from the electric device, enabling the electric device to power itself down. The apparatus further comprises an electronic latch comprising the battery-switching transistor, the power supply node, and at least one of the activation transistor and the deactivation transistor.

36 Claims, 5 Drawing Sheets

SELF-LATCHING POWER SUPPLY APPARATUS

BACKGROUND OF THE INVENTION

The present invention relates generally to power supplies and more specifically to battery-powered power supplies for electronic devices.

In a wide variety of environments it may be desirable to employ a battery-powered power supply for the purpose of making stored electrical energy available to an electronic device. In many cases, this control over the provision of battery energy may consequently be an effective means to activate and deactivate the electronic device. In some cases, the battery and its respective resistive load may not be easily accessible. One example of such a case may be when the resistive load and the battery are enclosed in a protective coating such as a potting material in order to resist adverse effects from an operating environment. Another example of such a case may be a downhole processor in a tool string with a single port of communication through the tool string.

Several battery power source apparatuses are known in the art. For example, U.S. Pat. No. 5,945,745 discloses an activation control for an automotive electronic module. A dimming circuit provides a dimming signal when a demand for energy is made, such as when headlights are turned on with an ignition switch turned off. The detector senses the dimming signal and operates a battery switch to power up a microprocessor controller from an unpowered state to control operation of the module when the demand for energy is made. There is no sleep mode. The microprocessor controller is only powered for as long as the dimming signal is present.

U.S. Pat. No. 4,455,623 discloses an apparatus for decreasing current consumption of microprocessors in battery-energized systems. The apparatus comprises a switch which connects it to the electrical supply only when a control signal is received which indicates that the microprocessor is to execute a program. For programs whose execution time is greater than the duration of the control signal, the microprocessor supplies a signal to the switch keeping it in the conductive state until the program has been fully executed. In this invention the microprocessor is only powered for as long as a control signal or signal from the microprocessor itself is present.

U.S. Pat. No. 4,279,020 discloses a power supply circuit for a data processor. The power supply circuit comprises a power up circuit comprising a single pair of complementary transistors arranged so that an output electrode of each transistor is connected to an input electrode of the other transistor. The power up circuit is latched on responsive operation of a data input circuit and supplies power to the processor when latched.

U.S. Pat. No. 3,535,560 discloses a multisection computer with operating power supplied intermittently to each of the several sections. Power is switched to the sections by the emitter-collector path of a transistor that remains on after a control waveform has terminated.

BRIEF SUMMARY OF THE INVENTION

A self-latching power supply apparatus is disclosed. The apparatus comprises an activation transistor in electrical communication with an input voltage source and a battery-switching transistor. Voltage detection circuitry may be intermediate the input voltage source and the activation transistor. The voltage detection circuitry may be selected from the group consisting of diode detectors, emitter-base junctions in bipolar junction transistors, and charge pump circuits. An input port may be intermediate and operably connected to the input voltage source and the charge pump circuit. The input port may be also function as a data input port.

The input voltage source may produce an input signal and its electric potential may be amplified by the charge pump circuit. The voltage detection circuitry may be configured to provide an activation signal to the activation transistor. The activation signal may be the amplified input signal from the charge pump circuit. The activation transistor is in electrical communication with a battery-switching transistor. The battery-switching transistor is connected to a battery and a power supply node for an electric device. The battery may be independent from the input voltage source.

The activation transistor may be configured to activate the battery-switching transistor, enabling voltage from the battery to be available at the power supply node for the electric device. A deactivation transistor may be in communication with the battery-switching transistor and configured to maintain the battery-switching transistor in its current state. The state-retention transistor may be controlled by circuitry from the electric device, enabling the electric device to power itself down.

The apparatus further comprises an electronic latch comprising the battery-switching transistor, the power supply node, and at least one of the activation transistor and the deactivation transistor.

For the purposes of this application, "self-latching" as used herein means that once the power supply is activated and makes battery power available to the power supply node, the electronic latch allows it to remain activated without any additional input signals required from the input voltage source. Likewise, the term "electrical communication" as used herein refers to two or more circuit elements configured in such a way that the flow of electrons in or electric charge of a first circuit element influences the flow of electrons in or electric charge of a second circuit element

DETAILED DESCRIPTION OF THE INVENTION AND THE PREFERRED EMBODIMENT

The attached figures in which like elements are labeled with like numerals and the following description of said figures are intended to illustrate certain embodiments of the invention, and not to limit its scope.

As used herein, the term "activation transistor" is defined as a transistor that is configured to activate a second transistor when current flows through it. Likewise, the term "deactivation transistor" is defined as a transistor that is configured to deactivated a second transistor when current flows through it. The term "battery-switching" transistor refers to a transistor configured to route battery power from one node to another node when activated.

Figure 1:
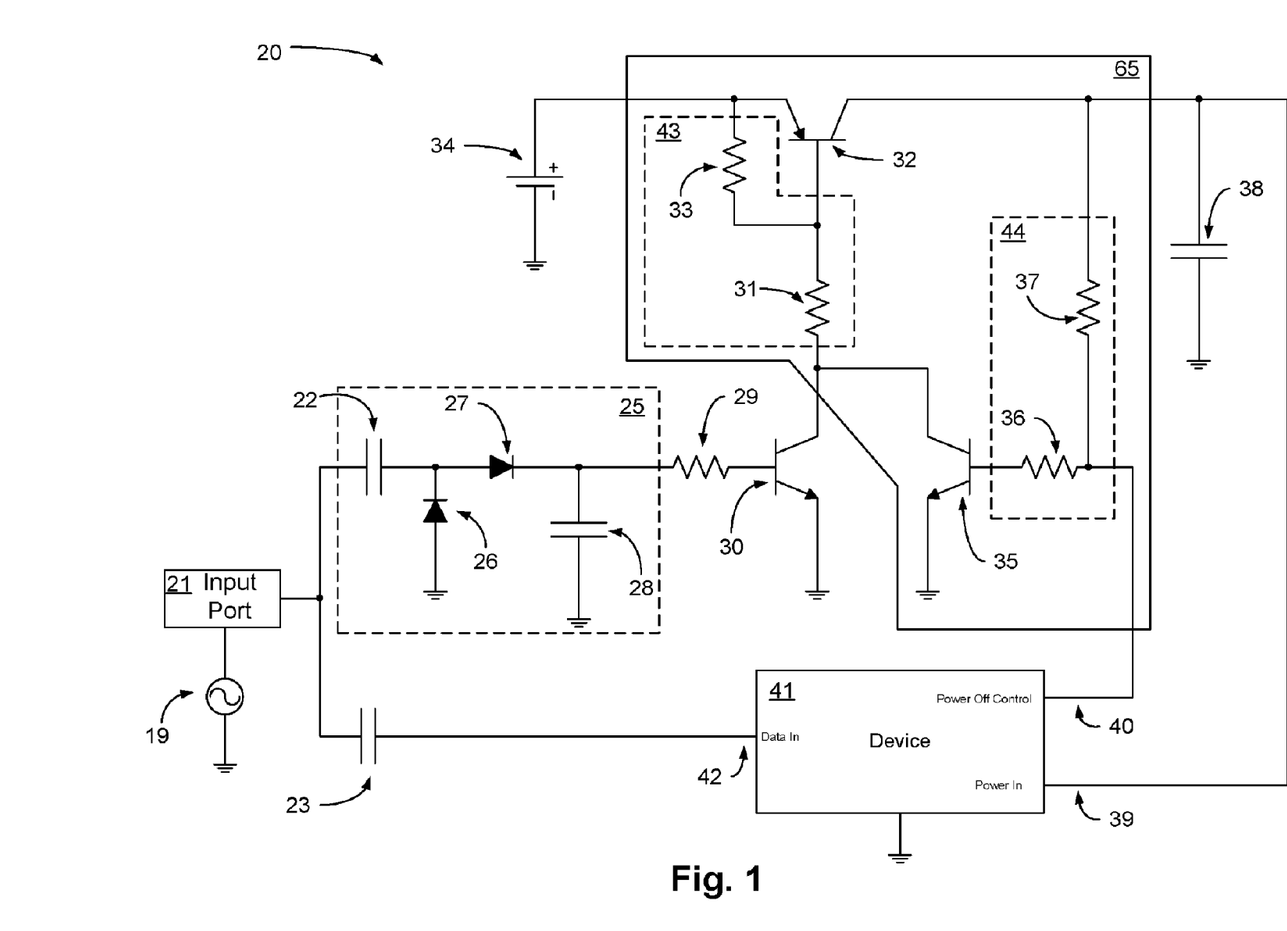
FIG. 1 is an electrical schematic of a self-latching power supply apparatus incorporating bipolar junction transistors.

Referring to FIG. 1, in some electronic systems, the ability to activate and deactivate an electronic device 41 and provide data to the device 41 through a single input port 21 may be advantageous. A self-latching power supply apparatus 20 (hereafter referred to as the power supply apparatus) comprises an activation transistor 30, a battery-switching transistor 32, and a deactivation transistor 35. While the invention may be implemented using any known type of transistors, in this embodiment the transistors 30, 32, 35 are bipolar junction transistors (BJTs) with each transistor 30, 32, 35 comprising a base, a collector, and an emitter. The activation and deactivation transistors 30, 35 may be npn type BJTs and the battery-switcher transistor 32 may be a pnp type BJT.

In this embodiment, an input voltage source 19 is in electrical communication with the activation transistor 30 through an input port 21 and voltage detection circuitry 25. The input port 21 may also be a data port for the electronic device 41. Series capacitors 22, 23 may allow for the reception of an electrical signal from the input port 21 by both the electronic device 41 and the power supply apparatus 20. In this manner, an initial input signal from the input voltage source 19 may be used to activate the power supply 20, and consequently the electronic device 41, while subsequent electrical signals may carry modulated data intended for reception by the electronic device 41.

The voltage detection circuitry 25 may comprise circuitry selected from the group consisting of diode detectors, emitter-base junctions in bipolar junction transistors, and charge pump circuits. In the present embodiment the voltage detection circuitry 25 is a charge pump circuit comprising series capacitor 22, a parallel capacitor 28, and two diodes 26, 27, each diode 26, 27 comprising an anode and a cathode. The anode of diode 26 may be connected to ground and the cathode of diode 26 may be in electrical communication with the input port 21 through series capacitor 22. The cathode of diode 26 may also be electrically connected to the anode of diode 27. The cathode of diode 27 may be connected to a first end of the capacitor 28, while the second end of the capacitor 28 may be electrically connected to ground. The charge pump circuit 25 may be configured to increase the voltage of an input signal. Preferably, the charge pump circuit 25 substantially doubles the voltage of an input signal from the input port 21.

In this particular embodiment of the invention, the voltage detection circuitry 25 is in electrical communication with the base of the activation transistor 30 through an intermediate bias resistor 29. The voltage detection circuitry 25 is configured to provide an activation signal to the activation transistor 30. Preferably, the activation signal is a modified input signal from the input signal generator. If the activation signal is of a high enough voltage, it may activate the activation transistor 30 by causing an electrical potential at the base of the activation transistor 30 to exceed a characteristic threshold voltage, thus putting the activation transistor 30 in a saturated state and allowing current to flow from the collector of the activation transistor 30 to the emitter of the activation transistor 30.

The emitter of the activation transistor 30 may be electrically connected to ground. In this embodiment of the invention, the collector of the activation transistor 30 is in electrical communication with the battery-switching transistor 32 by means of an electrical connection to a first voltage divider 43. The first voltage divider 43 may comprise a first resistor 31 electrically connected to a second resistor 33. A first end of the first resistor 31 may be connected to the collectors of the activation and deactivation transistors 30, 35 and a second end of the first resistor 31 may be electrically connected to the base of the battery-switching transistor 32 and a first end of the second resistor 33. A second end of the second resistor 33 may be electrically connected to the emitter of the battery-switching transistor 32 and to a positive terminal of a battery 34. Preferably, the battery 34 is separate and distinct from the input voltage source 19.

The battery-switching transistor is connected to the battery 34 and a power supply node 39 for the electronic device 41. In this embodiment, the collector of the battery-switching transistor 32 is electrically connected to the power supply node 39. When the power supply transistor 32 is activated, battery power is allowed to flow from its emitter to its collector, where it is made available to the electronic device 41 at the power supply node 39. The power supply node 39 may also comprise a shunting capacitor 38 connected to ground. The activation transistor 29 is configured to activate the battery-switching transistor 32 and may do so by lowering the electrical potential at the base of the battery-switching transistor 32 beneath a characteristic threshold voltage of the battery-switching transistor 32. This may be done by allowing current to flow from the collector of the activation transistor 30 to the emitter of the activation transistor 30 thus causing a voltage drop across the first resistor 31 and lowering the voltage at the base of the battery-switching transistor 32 to or beyond its threshold.

The power supply node 39 may also be connected to a second voltage divider 44 comprising a third resistor 36 electrically connected to a fourth resistor 37. A first end of the third resistor 36 may be electrically connected to the base of the deactivation transistor 35 and a second end of the third resistor 36 may be electrically connected to a first end of the fourth resistor 37. A second end of the fourth resistor 37 may be electrically connected to the power supply node 39.

The battery-switching transistor 32, the power-supply node 39, and the deactivation transistor 35 form an electronic latch 65 which allows the power supply 20 to retain its current state whether it is actively providing power to the power supply node 39 or not. In other words, values for resistors 36, 37 may be chosen such that when the battery-switching transistor 32 is in a saturated state and actively providing power to the power-supply node 39, the electric potential at the base of the deactivation transistor 35 will be above a characteristic threshold voltage causing the deactivation transistor 35 to operate in a saturated state. With the deactivation transistor 35 operating in a saturated state, a sufficient voltage drop is achieved across the first voltage divider 33 to enable the battery-switching transistor 32 to remain in a saturated state and continue routing battery power to the power supply node 39. If the battery-switching transistor 32 is in a cutoff state, no current will flow from its emitter to its collector, and consequently no power will be available to the power supply node 39. Thus, the deactivation transistor 35 will also be in a cutoff state. The power supply 20 may also comprise a control line 40 electrically connected to the junction of the third and fourth resistors 36, 37 in the second voltage divider 44. This control line 40 may be connected to circuitry in the electronic device 41 so that the electronic device 41 may have the ability to turn itself off. The power supply 20 may be deactivated by forcing the electrical potential of the control line 40 to a low enough voltage that the deactivation transistor 35 is forced into a cutoff state which would in turn force the battery-switching transistor 32 to a cutoff state and effectively route no battery power to the power supply node 39.

Figure 2:
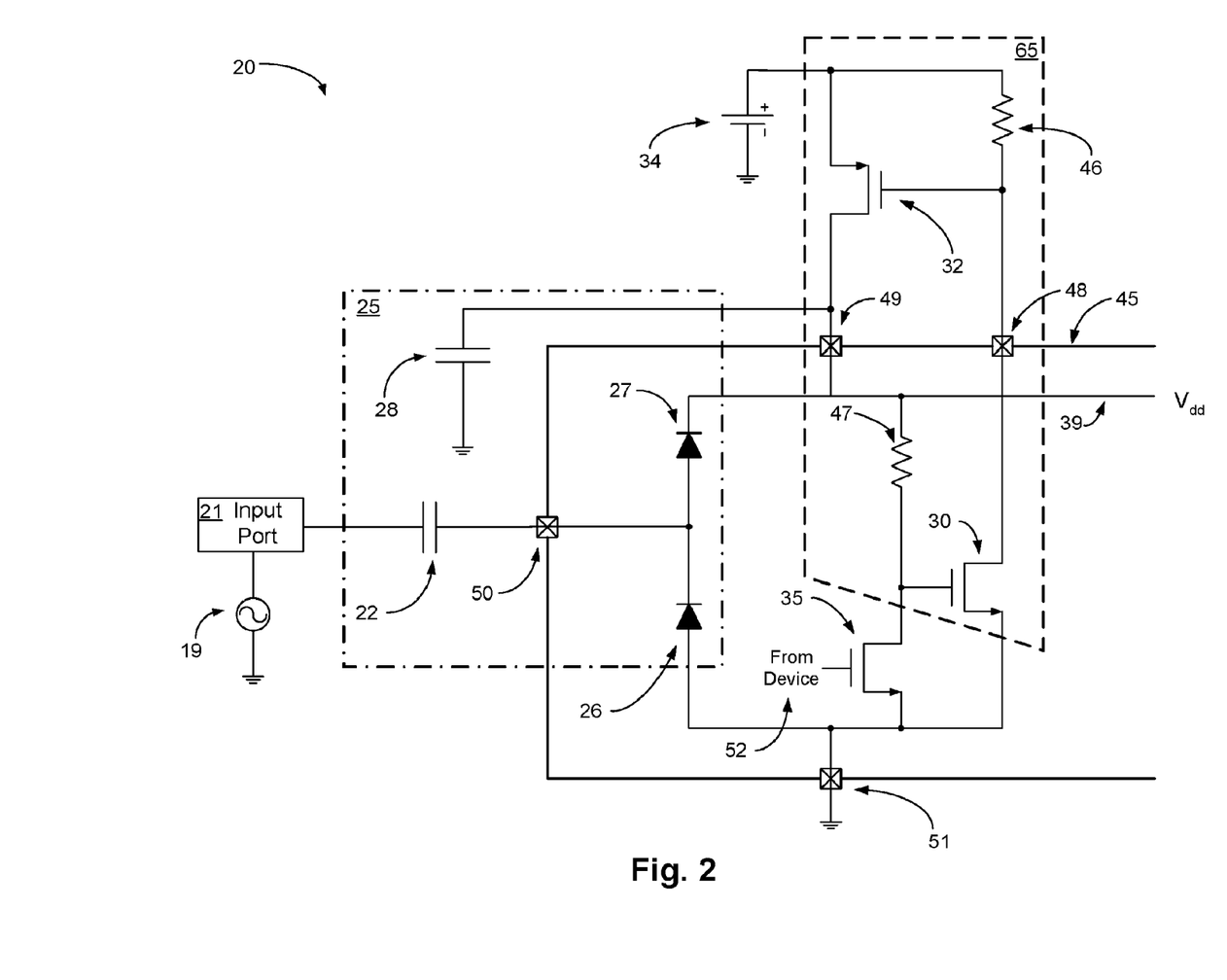
FIG. 2 is an electrical schematic of another embodiment of a self-latching power supply apparatus with a portion of the apparatus incorporated into an integrated circuit.

Referring now to FIG. 2, often an electronic device 41 controlled by a self-latching power supply 20 may be implemented as an integrated circuit on a semiconductor chip 45, making it advantageous for all or part of the power supply 20 to also be implemented as an integrated circuit on the same semiconductor chip. One such implementation may comprise an activation transistor 30, a deactivation transistor 35, and a portion of voltage detection circuitry 25 being directly implemented on the chip 45. In this embodiment, the voltage detection circuitry 25 is a charge pump. A battery 34, a battery-switching transistor 32, an input voltage source 19, the remaining portion of the voltage detection circuitry 25, and ground may interface with the semiconductor chip 45 through pins 48, 49, 50, 51. As in the embodiment of FIG. 1, preferably the battery 34 is separate and distinct from the input voltage source 19. One advantage of this implementation is that when using the same voltage detection circuitry 25 design as the embodiment of FIG. 1, the first and second diodes 26, 27 in the charge pump circuit may be protection diodes built into the input pin 50 of the semiconductor chip 45. A charge pump capacitor 28 may be electrically connected to the anode of the second diode 27 through pin 49 and complete the charge pump circuit 25. Series capacitor 22 may also interface with the protection diodes 26, 27 through pin 50.

The transistors 30, 32, 35 in this embodiment are field effect transistors (FETs), more specifically metal oxide semiconductor field effect transistors (MOSFETS) with each transistor 30, 32, 35 comprising a drain, a source, and a gate. In alternate embodiments, junction field effect transistors (JFETs), metal-semiconductor field effect transistors (MESFETs), heterostructure field effect transistors (HFETs), or other FETs may be used. The activation and deactivation transistors 30, 35 may be n-type FETs and the battery-switching transistor 32 may be a p-type FET.

As in the embodiment of FIG. 1, the input voltage source 19 is in electrical communication with the voltage detection circuitry 25 through an input port 21. The input port 21 may also receive data for the electronic device 41. The voltage detection circuitry 25 is also in electrical communication with the activation transistor 30 as the voltage on charge pump capacitor 28 influences the charge on the gate of activation transistor 30. A positive terminal on battery 34 may be electrically connected to the source of the battery-switching transistor 32. A first end of a first bias resistor 46 may be electrically connected to the source of the battery-switching transistor 32 and a second end of the first bias resistor 46 may be electrically connected to the gate of the battery-switching transistor 32. The drain of the battery-switching transistor 32 may be electrically connected to the charge pump capacitor 28 and a first end of a second bias resistor 47 through pin 49. The node 39 comprising pin 49 may be the power supply node 39 which in this embodiment provides a $V_{dd}$ voltage for the electronic device 41.

A second end of the second bias resistor 47 may be electrically connected to the gate of the activation transistor 30 and the drain of the deactivation transistor 35. Through this second bias resistor 47, the deactivation transistor 35 may be in electrical communication with the battery-switching transistor 32. The gate of the battery-switching transistor 32 and the second end of the first bias resistor 46 may be electrically connected to the drain of the activation transistor 30 through pin 48. The sources of the activation and state-retention transistors may be electrically connected to ground through pin 51. In this embodiment of the invention, the gate of the state-retention transistor 35 is electrically connected to a control line 40 that may be in electrical communication with logic in the electronic device 41.

The voltage detection circuitry 25 may be configured to provide an activation signal to the activation transistor 30. An input signal from the input voltage source 19 may double its voltage after passing through the voltage detection circuitry 25 and cause the electric potential of the gate of the activation transistor 30 to exceed a characteristic voltage threshold, thus forcing the activation transistor 30 into a state of saturation and allowing current to flow from its drain to its source. This allowance may constitute the activation signal for the battery-switching transistor, as it would provide a path for current to flow from the battery 34 through the first bias resistor 46 and the activation transistor 30 to ground. This in turn would lower the electric potential at the gate of the battery-switching transistor 32 beyond a characteristic threshold, forcing the battery-switching transistor 32 into a state of saturation and allowing current to flow from its source to its drain, which would effectively activate the battery-switching transistor 32 and create an electrical connection between the positive terminal on the battery and the power supply node 39.

In this embodiment, the electronic latch 65 is formed by the battery-switching transistor 32 and the activation transistor 30. As long as the battery-switching transistor 32 is activated and the deactivation transistor 35 is in a cutoff state, sufficient voltage from the battery 34 will be available at the gate of the activation transistor 30 to maintain the battery power at the power supply node 39.

In the event that the electronic device 41 should receive a command to power itself down or logically elect to power itself down, it may raise the voltage at the control line 40 connected to the gate of the deactivation transistor 35 thereby forcing the deactivation transistor 35 into a saturation state and effectively putting the gate of the activation transistor 30 at ground potential. With its gate at ground potential the activation transistor 30 would be unable to maintain the battery-switching transistor 32 in a saturation state, thus forcing the battery-switching transistor 32 into a cutoff state and effectively turning off the electronic device 41 by cutting off the provision of battery power to the power supply node 39.

Figure 3:
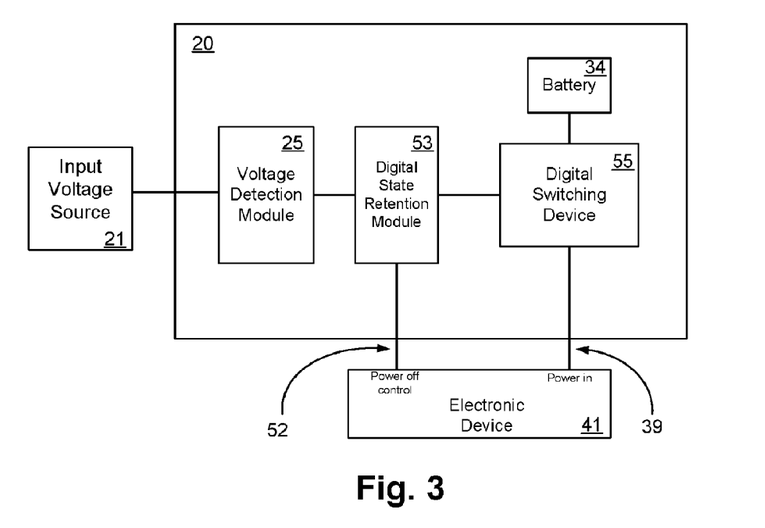
FIG. 3 is an operational block diagram depicting the modular layout of a self-latching power supply apparatus.

Referring now to FIG. 3, a modular layout of another embodiment of a self-latching power supply apparatus 20 consistent with the invention is depicted. This embodiment may comprise a voltage detector module 25 operably connected to an input voltage source 21 and a digital state retention module 53. In alternate embodiments, the input voltage source 21 may be connected to an input port that may comprise a data input port for an electronic device 41. The electronic device 41 may also comprise a separate input port for data or may not require data input at all, as in the present embodiment. The digital state retention module 53 is in digital communication with a digital switching device 55 operably connected to and intermediate a battery 34 and a power supply node 39. For the purposes of this disclosure, "digital communication" means that a binary value stored in the digital state retention module 53 is readily accessible to the digital switching device 55 and may influence the electronic behavior of the digital switching device 55.

The digital state retention module 53 may be adapted to retain a one-bit binary value indicative of an activation status of the power supply apparatus 20. For example, a digital '1' stored in the digital state retention module 53 may be indicative of a state wherein battery power is being supplied to the power supply node 39. Likewise, a digital '0' stored in the digital state retention module 53 may be indicative of a state wherein battery power is not being supplied to the power supply node 39. The digital state retention module 53 may comprise one or more digital latches. The digital switching device 55 may be configured to switch battery power on or off to the power supply node 39 according to a change in the value stored in the digital state retention module 53. The digital state retention module 53 may be influenced to change the value that it stores by a signal received from a control line 52 connected to the electronic device 41.

Figure 4:
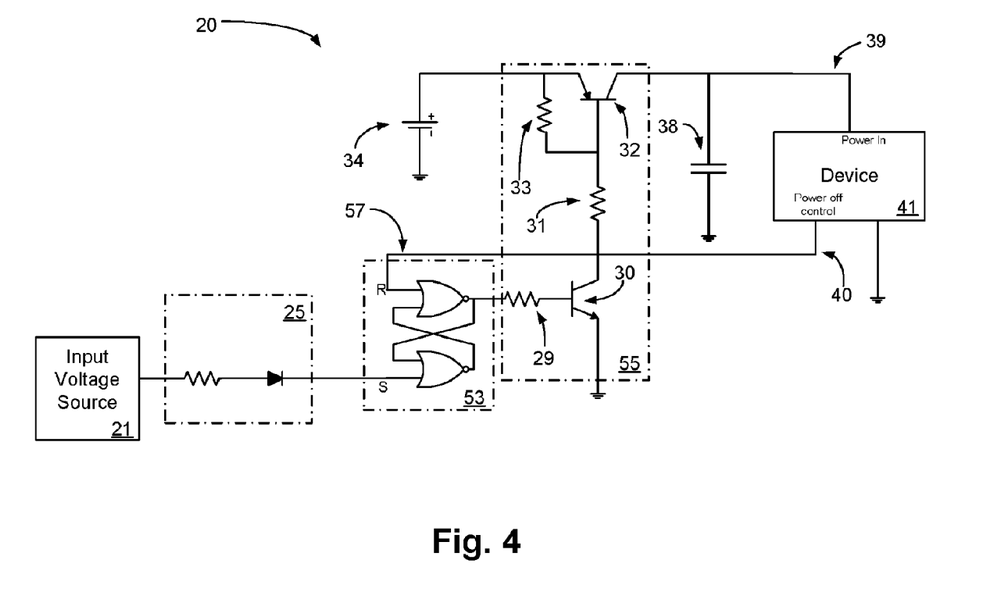
FIG. 4 is an electrical schematic of an embodiment of a self-latching power supply apparatus consistent with the modular layout depicted in FIG. 3.

Referring now to FIG. 4, a specific embodiment of a self-latching power supply apparatus according to the modular layout of FIG. 3 is shown. The voltage detection module 25 in this embodiment is a simple diode detector. The digital state retention module 53 may be an RS (Reset/Set) latch comprising two cross-coupled NOR gates 53. In other embodiments, the digital state retention module 53 may comprise other types digital latches or logical implementations of digital storage.

The digital state retention module 53 is operably connected to a digital switching device 55, which may comprise a bias resistor 29, an activation transistor 30, a voltage divider of two resistors 31, 33, and a battery-switching transistor 32. The transistors may be BJT transistors, each transistor comprising a base, a collector, and an emitter. In alternate embodiments, the transistors may be FET transistors or any other type of transistors.

The digital state retention module 53 may be set to store a digital value of 1 through an input signal from the input voltage source 21. The voltage detection module 25 may only pass an input signal to the digital state retention module 53 if the voltage of the input signal is at or exceeds a certain threshold. The input signal may cause the voltage of a set node (S) in the digital state retention module 53 to exceed a characteristic threshold and store the digital value of 1 in the digital state retention module 53.

When a digital value of 1 is stored in the digital state retention module 53, the base of the activation transistor 30 will be above the characteristic threshold of the transistor 30, thus allowing current to flow from the battery 34 through resistors 33, 31 and the transistor 30 to ground. With current flowing through resistors 33, 31 to ground, the voltage at the base of the battery-switching transistor 32 may be lowered below that of a characteristic threshold and activate the transistor 32. If the battery-switching transistor 32 is activated, power from the battery 34 may be effectively routed to a power supply node 39 for the device 41. A shunting capacitor 38 may be electrically connected to the collector of the battery-switching transistor 32 and ground.

This embodiment of the invention also comprises a control line 40 from the electronic device 41 connected to a reset (R) node of the digital state retention module 53. In the event that the electronic device 41 should need to turn itself off, it could maintain a voltage greater than or equal to the characteristic threshold of the digital retention module 53 thus causing the digital retention module 53 to store a digital 0 value. As long as a digital 0 value is being stored in the digital state retention module 53, the activation transistor 30 will be in a cutoff state which will in turn cause the battery-switching transistor 32 to be in a cutoff state and power to the electronic device 41 will be effectively shut off.

Figure 5:
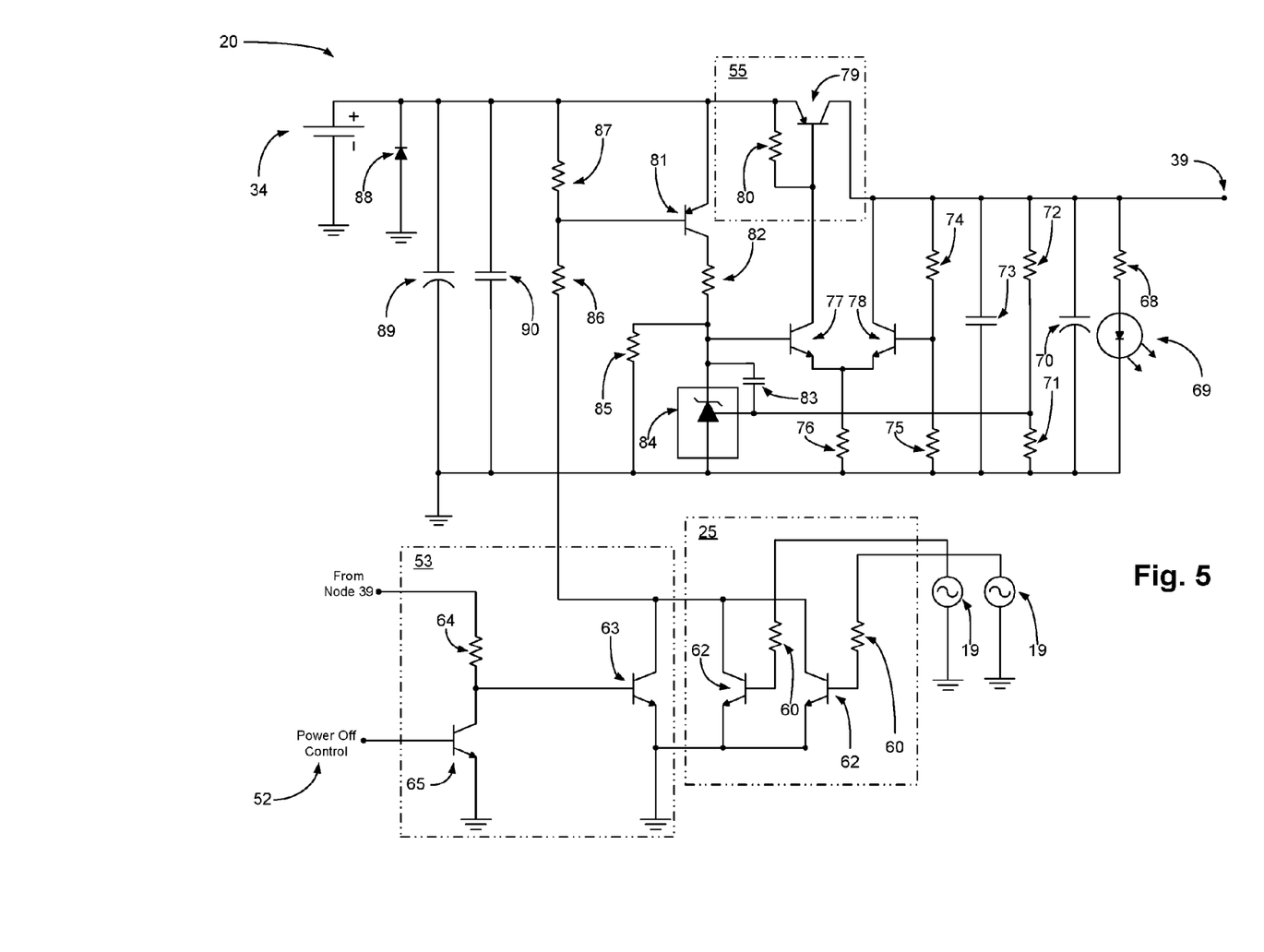
FIG. 5 is an electrical schematic of a self-latching power supply apparatus with voltage regulation circuitry.

With reference now to FIG. 5, a self-latching power supply 20 may further comprise voltage regulation circuitry to maintain the voltage at the power-supplying node 39 substantially constant. In this embodiment more than one input voltage source 19 may provide an input signal for the power supply 20. The voltage detection module 25 may therefore comprise activation transistors 62 and bias resistors 60 for each of the input voltage sources 19. The voltage detection module 25 is connected to the digital state retention module 53. The digital state retention module 53 may store a one-bit digital value indicative of the activation state of the battery 34. In this particular embodiment, the voltage level at the base of transistor 63 reflects said value. If the voltage at the base of transistor 63 is HIGH, the battery is activated and battery power is being routed to the power-supplying node 39. Battery power may then be routed to an electronic device 41. Current from the power-supplying node 39 may then pass through resistor 64 to maintain the base of transistor 63 at a HIGH voltage. If the power off control line 52 is raised to a HIGH voltage while the battery is activated, transistor 65 will become activated and the base of transistor 63 will be effectively at a ground potential and deactivate the battery 79. The power off control line 52 may receive input from the electronic device 41.

The digital switching device 55 may comprise a battery-switching transistor 79 intermediate the positive terminal of the battery 34 and the power-supplying node 39. A resistor may be electrically connected to the base of the battery-switching transistor 79 and the positive terminal of the battery 34.

Upon receiving a high enough input voltage from one or more of the input voltage sources 19, the voltage detection module 25 may provide an activation signal that allows the digital switching device 55 to route battery power from the battery 34 to the power-supplying node 39 and also sets the value of the digital state retention module 53 to a HIGH voltage. This may occur by the input voltage source turning on at least one of the activation transistors 62 which may then provide an electrical path from the positive terminal of the battery 34 through resistors 87, 86 to ground. Current will flow through this path, causing a voltage drop across resistors 87, 86. The voltage drop across resistor 87 may be sufficient enough to lower the voltage at the base of transistor 81 beneath its characteristic threshold and activate it.

Resistance values of resistors 82, 85 may be chosen such that as current is allowed to flow from the positive terminal of the battery 34 through resistors 82, 85 to ground, the voltage at the base of transistor 77 is greater than its characteristic threshold and transistor 77 may then be activated. This would allow current to flow from the positive terminal of the battery 34 through resistors 80, 76 to ground. The voltage drop across resistor 80 may be great enough to lower the voltage at the base of the battery-switching transistor 79 beyond its characteristic threshold and thus activate the battery-switching transistor 79. As a result, battery power may be routed from the battery 34 to the power-supplying node 39 and the power supply apparatus 20 would be considered activated or on.

Once battery power is available at the power-supplying node 39, transistor 63 in the digital state retention module 53 may be activated and continue to provide a path for current to flow from the positive terminal of the battery 34 through resistors 87, 86 to ground and thus maintain the power supply apparatus 20 in its activated state. Shunting capacitors 70, 73 may be connected to the power-supplying node 39 and ground. Additional shunting capacitors 89, 90 may be connected to the positive terminal of the battery 34 and ground. A diode 88 may comprise a cathode connected to ground and an anode connected to the positive terminal of the battery 34. A light-emitting diode (LED) 69 and a bias resistor 68 may be connected to the power-supplying node 39 and ground to indicate when battery power is routed to the power-supplying node 39.

A voltage regulator device, in this embodiment an adjustable precision zener shunt regulator 84, may maintain the voltage at the power-supplying node 39 substantially constant. One suitable adjustable precision zener shunt regulator 84 is model LM431, which is available from various manufacturers and is well-known in the art. The regulator 84 may comprise three terminals: a reference, an anode, and a cathode. A junction between resistors 72, 71 may be electrically connected to the reference terminal of the regulator 84. The voltage at the junction may therefore affect the voltage drop from the anode of the regulator 84 to its cathode. This voltage drop would proportionally influence the voltage level at the base of transistor 77 and by consequence the voltage of the power-supplying node 39.

The network of resistors 74, 75 and transistor 78 may provide a bias voltage for transistor 77 due to the fact that adjustable precision zener shunt regulators 84 typically require a correct bias voltage in order to operate as desired. A capacitor 83 may be connected between the cathode and the reference nodes of the regulator 84.

Figure 6:
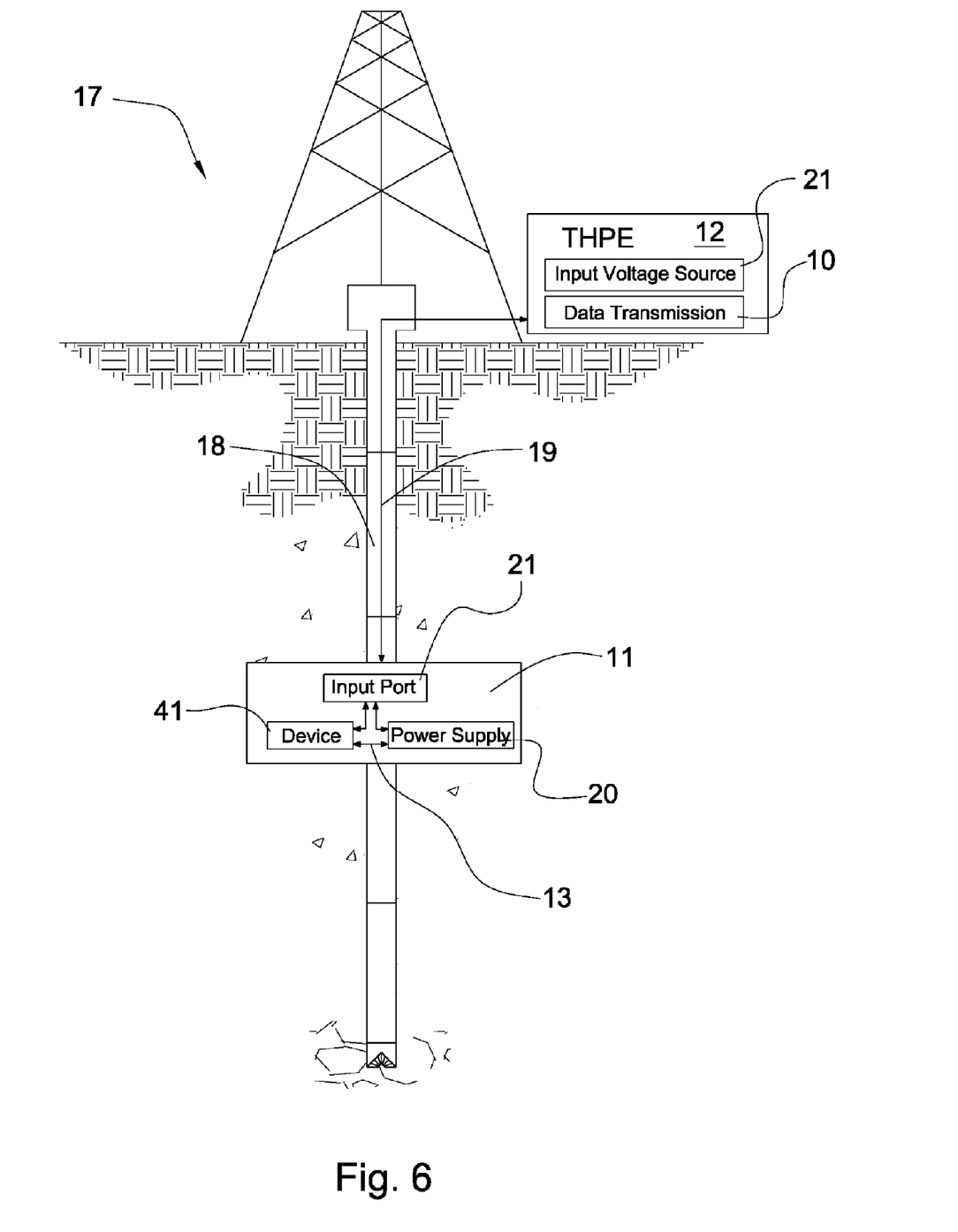
FIG. 6 is a block electrical schematic of a drilling rig incorporating a self-latching power supply apparatus.

Referring now to FIG. 6, one use of a self-latching power supply 20 is in a downhole environment at a drilling site 17. The power supply 20 may be configured to provide electrical power to an electronic device 41 in a downhole tool string 18. The downhole tool string 18 may be equipped to transmit data or power between a surface location and a downhole location through a downhole transmission system 19. A preferred downhole transmission system 19 is disclosed in U.S. Pat. No. 6,670,880 to Hall, et. al. and is incorporated herein by reference for all that it teaches. A node 11 located on the downhole tool string 18 may be in electrical communication with a top-hole processing element 12 through said downhole transmission system 19. Electric signals may be transmitted from the top-hole processing element 12 to the electronic device 41 or self-latching power supply 20 through an input port 21.

The top-hole processing element 12 may comprise an input voltage source 21 for activating the self-latching power supply 20 and data transmission circuitry 16 for communication with the electronic device 41. The electronic device 41 may be in electrical communication with the power supply 20 and further comprise a control line 13 configured to turn the power supply 20 off. According to this embodiment, the top-hole processing element 12 may remotely turn on the power supply 20 by sending an input signal from the input voltage source 21 through the downhole data transmission system 19 to the input port 21 of the downhole node 11 where it is received by the power supply. Upon receiving the activation signal, the power supply may provide electrical power to the electronic device 41. Due to its self-latching nature, the power supply 20 may continue to provide electrical power to the electronic device 41 until it receives a signal on the control line 13 that causes the power supply 20 to turn itself off.

Whereas the present invention has been described in particular relation to the drawings attached hereto, it should be understood that other and further modifications apart from those shown or suggested herein, may be made within the scope and spirit of the present invention.

What is claimed is:

1. A self-latching power supply apparatus comprising:
   an activation transistor in electrical communication with an input voltage source and a battery-switching transistor;
   the battery-switching transistor being connected to a battery and a power-supplying node for an electric device;
   a deactivation transistor in electrical communication with the battery-switching transistor; and
   an electronic latch comprising the battery-switching transistor, the power-supplying node, and at least one of the activation transistor and the deactivation transistor,
   wherein an initial electrical input signal from the input voltage source activates the power supply, while subsequent electrical signals carry modulated data intended for reception by the activated electronic device.

2. The apparatus of claim 1, wherein the input voltage source is separate and distinct from the battery.

3. The apparatus of claim 1, further comprising voltage detector circuitry intermediate and operably connected to the input voltage source and the activation transistor.

4. The apparatus of claim 3, wherein the voltage detector circuitry comprises circuitry selected from the group consisting of diode detectors, emitter-base junctions in bipolar junction transistors, and charge pump circuits.

5. The apparatus of claim 4, wherein the charge pump circuit comprises protection diodes in an integrated circuit.

6. The apparatus of claim 1, further comprising an input port intermediate the input voltage source and the activation transistor.

7. The apparatus of claim 1, wherein the input port is configured to route data to the electric device.

8. The apparatus of claim 1, further comprising a shunting capacitor electrically connected to the power-supplying node for the electric device and ground.

9. The apparatus of claim 1, wherein the transistors are bipolar junction transistors with each transistor comprising a base, a collector, and an emitter.

10. The apparatus of claim 9, wherein the activation transistor and deactivation transistor are npn type bipolar junction transistors.

11. The apparatus of claim 9, wherein the battery-switching transistor is a pnp type bipolar junction transistor.

12. The apparatus of claim 9, further comprising a first voltage divider circuit comprising a first end of a first resistor electrically connected to the collector of the activation transistor, a second end of the first resistor electrically connected to a first end of a second resistor and to the base of the battery-switching transistor, and a second end of the second resistor electrically connected to the battery and to the emitter of the battery-switching transistor.

13. The apparatus of claim 9, further comprising a second voltage divider circuit comprising a first end of a third resistor electrically connected to the base of the deactivation transistor, a second end of the third resistor electrically connected to a first end of a fourth resistor, and a second end of the fourth resistor electrically connected to the power-supplying node.

14. The apparatus of claim 13, comprising a control line electrically connected to the second end of the third resistor and the first end of the fourth resistor of the second voltage divider circuit and adapted to provide a signal that turns the power supply apparatus off.

15. The apparatus of claim 9 wherein the power-supplying node is electrically connected to the collector on the battery-switching transistor.

16. The apparatus of claim 1, wherein the transistors are field effect transistors with each transistor comprising a drain, a source, and a gate.

17. The apparatus of claim 16, wherein the activation transistor and deactivation transistor are n-type field effect transistors.

18. The apparatus of claim 16, wherein the battery-switching transistor is a p-type field effect transistor.

19. The apparatus of claim 16, further comprising a first bias resistor with a first end electrically connected to the source of the battery-switching transistor and a second end electrically connected to the gate of the battery-switching transistor.

20. The apparatus of claim 16, further comprising a second bias resistor with a first end connected to the drain of the battery-switching transistor and a second end connected to the gate of the activation transistor and the drain of the deactivation transistor.

21. The apparatus of claim 20, wherein the connection of the first end of the second bias resistor to the source of the battery-switching transistor comprises the power-supplying node for the electric device.

22. The apparatus of claim 20, wherein the connection of the first end of the second bias resistor to the source of the battery-switching transistor comprises a pin on an integrated circuit.

23. The apparatus of claim 16, wherein the gate of the deactivation transistor is connected to control circuitry from the electric device.

24. The apparatus of claim 16, wherein the gate of the battery-switching transistor is electrically connected to the drain of the activation transistor.

25. The apparatus of claim 16, wherein the source of the deactivation transistor and the source of the activation transistor are electrically connected to ground.

26. The apparatus of claim 1, wherein the self-latching power supply apparatus is located in a downhole tool.

27. A self-latching power supply apparatus comprising:
a voltage detection module operably connected to an input voltage source and a digital state retention module to activate an electronic device; and
the digital state retention module being in electronic communication with a digital switching device;
wherein the digital switching device is operably connected to and intermediate a battery and a power-supplying node wherein an initial electrical input signal from the input voltage source activates the power supply, while subsequent electrical signals carry modulated data intended for reception by the activated electronic device.

28. The apparatus of claim 27, further comprising an input port intermediate and operably connected to the input voltage source and the voltage detection module.

29. The apparatus of claim 27, wherein the digital state retention module is adapted to retain a one-bit binary value indicative of an activation status of the battery.

30. The apparatus of claim 29, wherein the digital state retention module comprises a digital latch.

31. The apparatus of claim 29, wherein the value retained by the digital state retention module may be altered to deactivate the battery.

32. The apparatus of claim 29, further comprising control circuitry configured to alter the value retained by the digital state retention module.

33. The apparatus of claim 27, wherein the digital switching device comprises at least one transistor.

34. The apparatus of claim 27, wherein the voltage detection module is configured to store a value in the digital state retention module.

35. The apparatus of claim 27, wherein the voltage detection module is selected from the group consisting of diode detectors, emitter-base junctions in bipolar junction transistors, and charge pump circuits.

36. The apparatus of claim 27, further comprising voltage regulation circuitry configured to maintain the voltage at the power-supplying node substantially constant.

* * * * *